G. C. W. GOSS.
BASKET.
APPLICATION FILED MAY 13, 1921.

1,433,451.

Patented Oct. 24, 1922.
2 SHEETS—SHEET 1.

Inventor
George C. W. Goss.
By Frederick V. Winters
Attorney

G. C. W. GOSS.
BASKET.
APPLICATION FILED MAY 13, 1921.

1,433,451.

Patented Oct. 24, 1922.
2 SHEETS—SHEET 2.

Inventor
George C. W. Goss.

By Frederick V. Winters
Attorney

Patented Oct. 24, 1922.

1,433,451

UNITED STATES PATENT OFFICE.

GEORGE C. W. GOSS, OF NEW YORK, N. Y.

BASKET.

Application filed May 13, 1921. Serial No. 469,130.

*To all whom it may concern:*

Be it known that I, GEORGE C. W. GOSS, a citizen of the United States, residing at New York, in the county and State of New York, have invented certain new and useful Improvements in Baskets, of which the following is a full, clear, and exact specification.

This invention relates to baskets and has for its object to provide material from which children may make ornamental baskets for amusement and instruction.

The invention contemplates the provision of sets of supplemental members which may be assembled to form baskets according to directions to be inclosed with said sets. Each set includes a member for forming the bottom of a basket, and a plurality of members for forming the sides of the basket. The side members are preferably smaller than the bottom members, and all of the members are preferably shaped to conform to the same geometrical figure.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

While the bottom and side members may be formed in various geometrical figures, they are preferably made in the form of stars, the bottom member 1 being somewhat larger but formed in the same proportions as the side members 2. The number of side members provided corresponds to the number of points on the stars, there being eight such points and side members in this instance.

Figure 1:
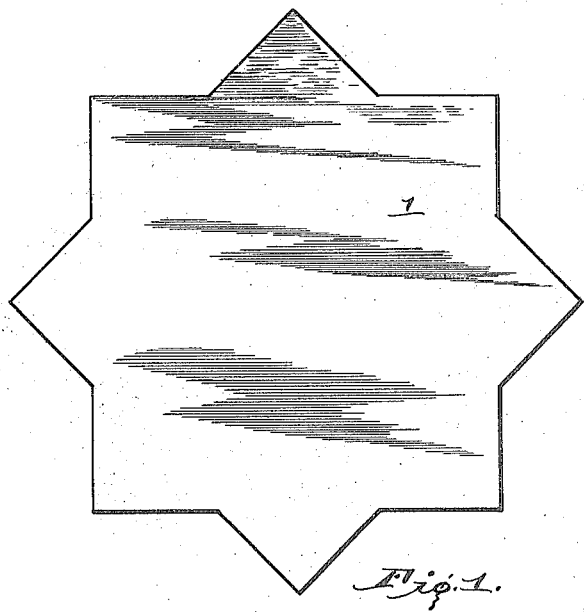
Figure 1 is a plan view of one form of bottom member to be used in forming a basket.
Figure 2:
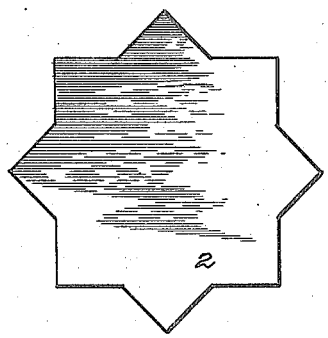
Figure 2 is a similar view of one of the side members to be used with said bottom member.
Figure 4:
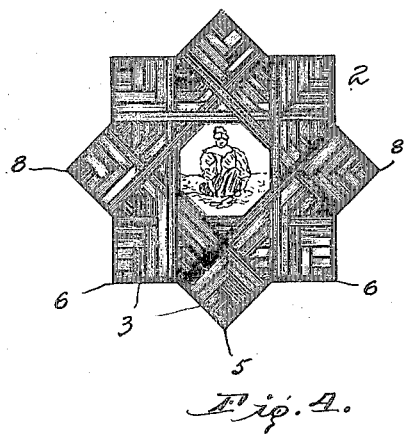
Figure 4 is a similar view of one of the side members correspondingly decorated.
Figure 3:
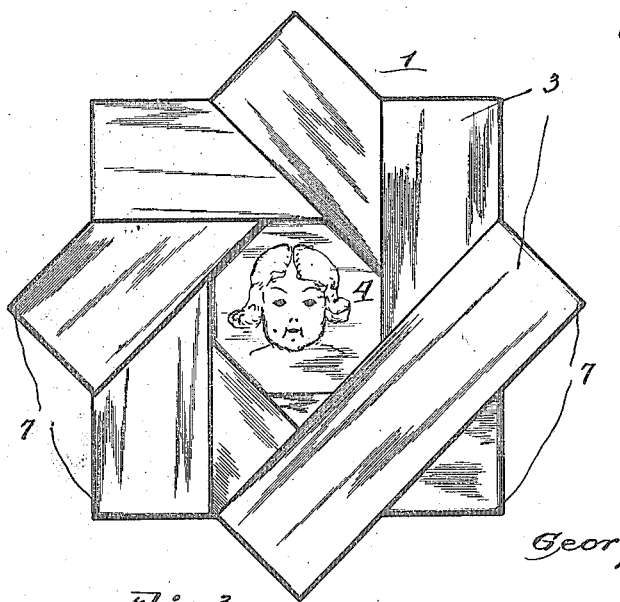
Figure 3 is a plan view of the bottom member decorated as contemplated by the invention.

Each of the star-shaped members 1 and 2 may be made of any inexpensive material, such as cardboard, wood, or the like, and said members may be pleasingly decorated by strips 3 of various colored materials wrapped or otherwise suitably fastened to the marginal portions of said members, as illustrated in Figures 3 and 4. The middle portions of the members, within the marginal decorating strips, may be covered by pictures or illustrations 4, or other suitable decorations, the marginal strips serving as frames for said central pictures or decorations. The width of the marginal decorating strips 3 may be varied, those in Figure 3 being considerably wider than those in Figure 4. It will be understood that the arrangement and manner of applying said strips may also be widely varied without departing from the present invention.

Figure 5:
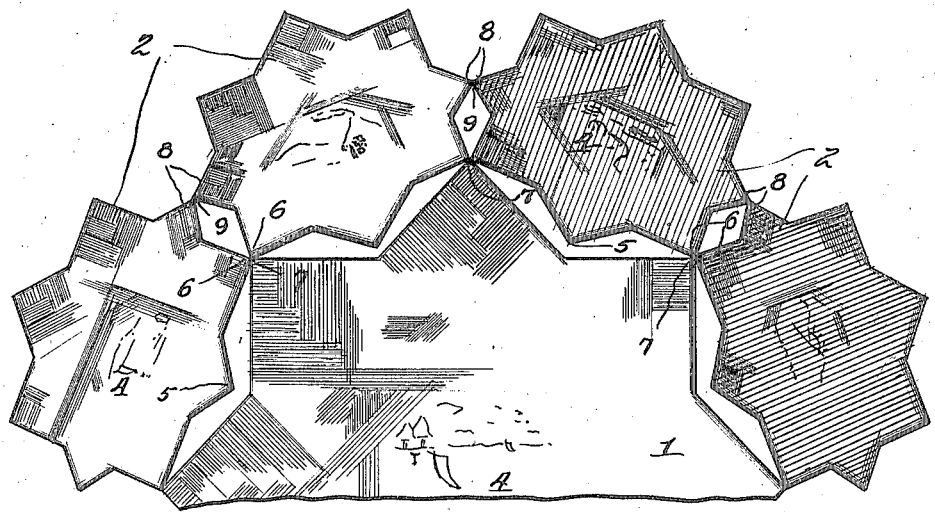
Figure 5 is a bottom plan view of a portion of the basket formed by assembling the side and bottom members.
Figure 6:
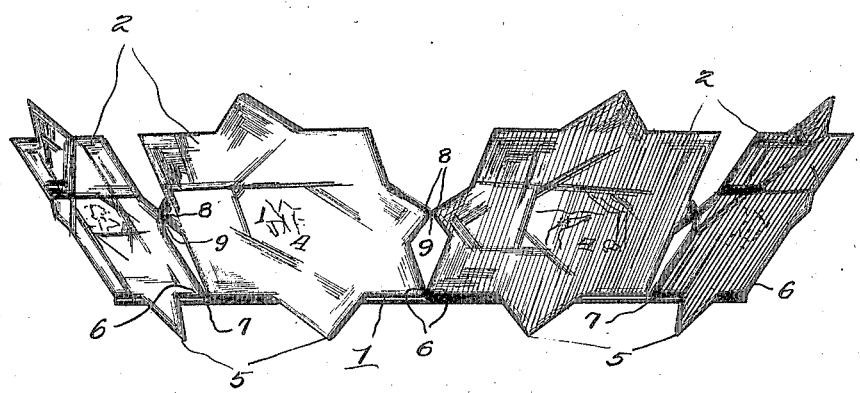
Figure 6 is a side elevation of said basket.

With each set, consisting of a bottom member 1, a plurality of side members 2, and decorating strips 3, directions will be furnished for decorating the members and assembling them into the form of a basket. In thus assembling said members, one point 5 of each of the star-shaped side members 2 is placed in the space between each pair of adjacent points of the star-shaped bottom member 1, and the points 6 on said side members, at opposite sides of the first mentioned point thereof, are sewed or otherwise secured to the adjacent points of the bottom member, as at 7 in Figures 5 and 6, so that points of two of the star-shaped side members are fastened to each of the points of the star-shaped bottom member. The diametrically opposite points 8 on the side members, adjacent to points 6 thereof, are sewed or otherwise secured to one another, as at 9 in Figures 5 and 6, thus supporting said side members in an inclined position with respect to the bottom member and forming the sides or rim of a basket. The points 5 of the side members then project slightly below the bottom member and constitute legs or supports for the basket, as best shown in Figure 6.

I claim:

1. A basket comprising a star-shaped bottom member, and a plurality of smaller star-shaped side members, certain points of said star-shaped side members being secured to the points of the star-shaped bottom member, and other points of said star-shaped side members being secured together substantially as shown and described.

2. A basket comprising a star-shaped bottom member, and a plurality of smaller star-shaped side members, certain points of said star-shaped side members being secured to the points of the star-shaped bottom member, and other points of said star-shaped side members being secured together substantially as shown and described, one point of each of said star-shaped side members projecting below the bottom member for the purpose specified.

3. An educational appliance comprising a plurality of members to be fastened together for forming a basket, each of said members having decorating strips applied to its marginal portion, and decorating means arranged on the central portion of each member, the decorating strips constituting a frame for said central decorating means.

4. An educational appliance comprising a plurality of star-shaped members for forming a basket, each of said members having decorating strips folded over its marginal portion, each strip extending between parallel edges of points of the star, and decorating means on the central portion of each member, said strips constituting a frame for said central decorating means.

In testimony whereof I have signed my name to this specification.

GEORGE C. W. GOSS.